US009223945B2

(12) United States Patent
Sandler et al.

(10) Patent No.: US 9,223,945 B2
(45) Date of Patent: Dec. 29, 2015

(54) CODE DIVERSITY METHOD AND SYSTEM (71) Applicant: Cisco Technology, Inc., San Jose, CA (US)

(72) Inventors: Leonid Sandler, Jerusalem (IL); Michael Burns, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/716,948

(22) Filed: May 20, 2015

(65) Prior Publication Data
US 2015/0269367 A1 Sep. 24, 2015

Related U.S. Application Data (62) Division of application No. 13/700,542, filed as application No. PCT/IB2011/053975 on Sep. 12, 2011, now Pat. No. 9,118,461.

(60) Provisional application No. 61/455,495, filed on Oct. 21, 2010.

(51) Int. Cl.
*H04L 9/08* (2006.01)
*G06F 21/12* (2013.01)
(52) U.S. Cl.
CPC ............... *G06F 21/125* (2013.01); *H04L 9/08* (2013.01); *G06F 2221/07* (2013.01)
(58) Field of Classification Search
CPC .......... G06F 21/125; G06F 2221/2107; H04L 9/0816
See application file for complete search history.

(56) References Cited

U.S. PATENT DOCUMENTS

| 5,892,899 A | 4/1999 | Aucsmith et al. |
| 7,243,236 B1 | 7/2007 | Sibert |
| 7,464,269 B2 | 12/2008 | Johnson et al. |

(Continued)

FOREIGN PATENT DOCUMENTS

| EP | 001850261 | 10/2007 |
| WO | WO2011001204 | 1/2011 |

OTHER PUBLICATIONS

Cappaert, Jan et al; Towards Tamper Resistant Code Encryption: Practice and Experience (May 7, 2007).

(Continued)

*Primary Examiner* — Amir Mehrmanesh
(74) *Attorney, Agent, or Firm* — Samuel M. Katz (57) ABSTRACT

In one embodiment, a processing device includes a memory to store an executable program including a multiplicity of encrypted component blocks such that different combinations of blocks selected from the encrypted component blocks are operative when decrypted and executed to perform a same functionally equivalent data transformation, each of the component blocks being operative upon execution to convert input data into output data, and a processor operative to receive a selection of cryptographic keys, decrypt some of the encrypted component blocks using the cryptographic keys such that each one of the some encrypted component blocks is decrypted with a different one of the cryptographic keys yielding a multiplicity of decrypted component blocks, and execute the executable program including the multiplicity of decrypted component blocks to perform the same functionally equivalent data transformation. Related apparatus and methods are also described.

4 Claims, 5 Drawing Sheets (56) References Cited

U.S. PATENT DOCUMENTS

| | | |
|---|---|---|
| 7,512,986 B2 | 3/2009 | Shen-Orr et al. |
| 2002/0138750 A1 | 9/2002 | Gibbs et al. |
| 2004/0123122 A1 | 6/2004 | Asai et al. |
| 2004/0177257 A1 | 9/2004 | Fujinawa et al. |
| 2004/0268322 A1 | 12/2004 | Chow et al. |
| 2005/0066173 A1 | 3/2005 | Bergh et al. |
| 2008/0077755 A1 | 3/2008 | Kitaj et al. |
| 2008/0320452 A1 | 12/2008 | Thompson |
| 2009/0196418 A1 | 8/2009 | Tkacik et al. |
| 2010/0082997 A1 | 4/2010 | Elbaum et al. |
| 2010/0153717 A1 | 6/2010 | Sandler et al. |
| 2011/0271104 A9 | 11/2011 | Sandler et al. |
| 2012/0033809 A1 | 2/2012 | Huang |

OTHER PUBLICATIONS

Gu, Quun; Efficient Code Diversification for network reprogramming in sensor networks. In Proceedings of the third ACM conference on Wireless network security (WiSec '10). ACM New York, USA, 145-150.

Kisserli, Nessim et al; Software Security through Targeted Diversification; Workshop Proceedings: Code Based Software Security Assessments (CoBaSSA 2007), Oct. 31, 2007, pp. 1-4 XP55014661.

International Search Report and Written Opinion, Dec. 22, 2011.

CODE DIVERSITY METHOD AND SYSTEM

RELATED APPLICATION INFORMATION

The present application is a divisional application of co-pending U.S. patent application Ser. No. 13/700,542, which is a 35 USC §371 application of PCT/IB2011/053975, filed on 12 Sep. 2011 and entitled "Code diversity method and system", which was published on 26 Apr. 2012 in the English language with International Publication Number WO 2012/052862 and which relies for priority on U.S. Provisional Patent Application Ser. No. 61/455,495 of Sandier, et al., filed 21 Oct. 2010.

FIELD OF THE INVENTION

The present invention relates to program code diversity.

BACKGROUND OF THE INVENTION

By way of introduction, one possible technique to protect against, reverse engineering of executable software is to present a "moving target" by creating multiple instances of a compiled program that are functionally equivalent such that there are code variations between the different compiled instances. In this way an exploit crafted to succeed against one instance of the compiled software will not necessarily work against a second instance. This technique is known as software diversity.

Another technique that protects against static analysis of programs is to encrypt the whole program and decrypt the executable code at run-time.

The following references are also believed to represent the state of the art:

US Published Patent Application 2004/0268322 of Chow, et al.;

US Published Patent Application 2008/0320452 of Thomson;

US Published Patent Application 2010/0082997 of Elbaum et al.;

US Published Patent Application 2010/0153717 of Sandler, et al.;

U.S. Pat. No. 7,464,269 to Johnson, et al.; and

U.S. Pat. No. 7,512,986 to Shen-Orr, et al.

SUMMARY OF THE INVENTION

The present invention, in certain embodiments thereof, seeks to provide an improved software diversity method and system.

The system of the present invention, in embodiments thereof, is operative to create software diversity such that multiple instances of an executable program are produced from a single original where each instance is functionally equivalent, for example, bat not limited to, the protection of a software program against reverse engineering.

In certain embodiments, there may be an advantage to creating code diversity at run-time tinder secure control.

The system of the present invention, in embodiments thereof, provides a system and method to create software diversity in a secure manner from a single original executable, typically at run-time.

The system of the present invention, in embodiment thereof, is operative to apply techniques that create software diversity, and also techniques that use code encryption. This may be particularly advantageous to software that runs in a closed execution environment, for example, but not limited to, Apple iPhone, where code running on a client device mast be authenticated prior to execution, to ensure that it has been approved by the platform owner and that it has not been subsequently tampered with. Specifically, once a program has been approved by the platform owner, it generally cannot be run in the closed execution environment if it has been subsequently modified even if the changes are designed to protect the program.

The system of the present inversion, in embodiments thereof, is operative to create software diversity for an executable program running in a closed execution environment in a way that is acceptable to the platform owner, for example, but not limited to, by providing the platform operator of the closed execution, environment with the ability to approve all diverse instances of the executable program by examining a single instance of the executable program, and such that the diverse instances of the program all comply with the integrity check of the program that the platform operator requires to be performed at run-time. This may be beneficial to, for example, but not limited to, the protection of the software from the extraction of secret and/or confidential information.

The system of the present invention, in embodiments thereof, is particularly useful for software that performs a data transformation, for example, but not limited to, cryptographic encryption and digesting functionality.

A data transformation is typically constructed from a number of component blocks, where each block performs a specific function in the execution of the data transformation. In the context of cryptography, as example of a block could be a hash function. The terms "component block" as used in the specification and claims, is defined as a chunk of executable code that performs a specific function as part of the data transformation.

An executable program that implements the data transformation typically includes a sufficient number of component blocks such that: (a) a specific instance of the data transformation can be realized by connecting a sub-set of the component blocks together; and (b) other instances of the data transformation can be realized by connecting different sub-sets of the component blocks together to perform the same data transformation.

The diversity of the executable code for the data transformation typically depends on the number of possible sub-sets of the component blocks that can be combined to be functionally equivalent.

Each of the component blocks that belong to the data transformation are typically individually encrypted with different keys so that different parts of the executable program are encrypted with the different keys. The executable program including all the encrypted component blocks is sent to all the client devices even though each device only need a sub-set of the component blocks in order to execute a particular instance of the data transformation. A client device is sent the decryption keys to decrypt those parts of the executable program including those component blocks which the client device needs to execute the instance of the data transformation which has been assigned to the device. The client device is also sent sequence information detailing the order that the component blocks should be executed, as well as additional input parameters. Other devices may be sent different combinations of keys so that different instances of the data transformation may be executed. In such a way, software diversity is generally achieved.

Therefore, each client will only receive the decryption keys for the specific set of component blocks that will be used in that particular client. Effectively, the set of decryption keys defines an individualized instance of the data transformation in a specific client device.

In a closed execution environment, the software program and all the decryption keys may typically be submitted to a platform owner with all the component blocks encrypted. The platform owner typically inspects the software program with all the blocks decrypted and can be satisfied that the encrypted code in the signed application is benign. The platform owner typically signs the software program with all the component blocks encrypted.

There is thus provided in accordance with an embodiment of the present invention, a software diversity system, including physical computing machinery including a executable provider to provide an executable program including a plurality of component blocks such that different combinations of blocks selected from the plurality of component blocks are operative when executed to perform a same functionally equivalent data transformation, each of the component blocks being operative upon execution to convert input data into output data, a cipher to encrypt the executable program by encrypting the plurality of component blocks with a plurality of cryptographic keys such that each of the plurality of component blocks is encrypted with a different one of the plurality of cryptographic keys yielding a multiplicity of encrypted component blocks within the executable program, a key selector to select a first selection of cryptographic keys from the plurality of the cryptographic keys for a first one of a plurality of processing devices, such that the first selection of cryptographic keys is operative to decrypt a first combination of die component blocks, the first combination of the component blocks being operative when executed to perform the same functionally equivalent data transformation thereby allowing the first processing device to perform the same data transformation by using the first combination of the component blocks, and select a second selection of cryptographic keys selected from the plurality of the cryptographic keys for a second one of the processing devices, such that the second selection of cryptographic keys is operative to decrypt a second combination of the component blocks, the second combination of the component blocks being operative when executed to perform the same functionally equivalent data transformation thereby allowing the second processing device to perform the same data transformation by using the second combination of the component blocks, wherein the first selection and the second selection include at least one different cryptographic key, and transfer module to prepare for transfer the first selection of cryptographic keys for transfer to the first processing device bat not including cryptographic keys of the plurality of cryptographic keys which are not in the first selection, and the second selection of cryptographic keys for transfer to the second processing device but not including cryptographic keys of the plurality of cryptographic keys which are not in the second selection.

Further in accordance with an embodiment of the present invention, each of the different combinations of blocks includes a sequence in which the component blocks are executed to perform the same functionally equivalent data transformation, the transfer module being operative to send sequence information to each one of the processing devices detailing the sequence appropriate to the combination of blocks executable by the one processing device.

Still further in accordance with an embodiment of the present invention, the processing devices are operative to execute the data transformation in a closed execution environment.

There is also provided in accordance with still another embodiment of the present invention, a processing device, including a memory to store an executable program including a multiplicity of encrypted component blocks such that different combinations of blocks selected from the encrypted component blocks are operative when decrypted and executed to perform, a same functionally equivalent data transformation, each of the component blocks being operative upon execution to convert input data into output data, and a processor operative to receive a selection of cryptographic keys, decrypt some of the encrypted component blocks using the cryptographic keys such that each one of the some encrypted component blocks is decrypted with a different one of the cryptographic keys yielding a multiplicity of decrypted component blocks, and execute the executable program including the multiplicity of decrypted component blocks to perform the same functionally equivalent data transformation.

Additionally in accordance with an embodiment of the present invention, each of the different combinations of blocks includes a sequence in which the component blocks are executed to perform the same functionally equivalent data transformation, the processor being operative to receive sequence information detailing the sequence appropriate to the component blocks decrypted by the processor.

Moreover in accordance with an embodiment of the present invention, the processor is operative to execute the data transformation in a closed execution environment.

There is also provided in accordance with sub another embodiment of the present invention, a software diversity method, including providing an executable program including a plurality of component blocks such that different combinations of blocks selected from the plurality of component blocks are operative when executed to perform a same functionally equivalent data transformation, each of the component blocks being operative upon execution to convert input data into output data, encrypting the executable program by encrypting the plurality of component blocks with a plurality of cryptographic keys such that each of the plurality of component blocks is encrypted with a different one of the plurality of cryptographic keys yielding a multiplicity of encrypted component blocks within the executable program, selecting a first selection of cryptographic keys from the plurality of the cryptographic keys for a first one of a plurality of processing devices, such that the first selection of cryptographic keys is operative to decrypt a first combination of the component blocks, the first combination of the component blocks being operative when executed to perform the same functionally equivalent data transformation/thereby allowing the first processing device to perform the same data transformation by using the first combination of the component blocks, and selecting a second selection of cryptographic keys selected from the plurality of the cryptographic keys for a second one of the processing devices, such that the second selection of cryptographic keys is operative to decrypt a second combination of the component blocks, the second combination of the component blocks being operative when executed to perform the same functionally equivalent data transformation thereby allowing the second processing device to perform the same data transformation by using the second combination of the component blocks, wherein the first selection and the second selection include at least one different cryptographic key, and preparing for transfer the first selection of cryptographic keys for transfer to the first processing device but not including cryptographic keys of the plurality of cryptographic keys which are not in the first selection, and the second selection of cryptographic keys for transfer to the second processing device but not including cryptographic keys of the plurality of cryptographic keys which axe not in the second selection.

There is also provided in accordance with still another embodiment of the present invention, a method including storing an executable program including a multiplicity of encrypted component blocks such that different combinations of blocks selected from the encrypted component blocks are operative when decrypted and executed to perform a same functionally equivalent data transformation, each of the component blocks being operative upon execution to convert input data into output data, receiving a selection of cryptographic keys, decrypting some of the encrypted component blocks using the cryptographic keys such that each one of the some encrypted component blocks is decrypted with a different one of the cryptographic keys yielding a multiplicity of decrypted component blocks, and executing the executable program including the multiplicity of decrypted component blocks to perform the same functionally equivalent data transformation.

There is also provided in accordance with still another embodiment of the present invention, a platform operator, operating a closed execution environment, including physical computing machinery including a receiver to receive an executable program including a multiplicity of encrypted component blocks such that different combinations of blocks selected from the encrypted component blocks are operative when decrypted and executed to perform a same functionally equivalent data transformation, each of the component blocks being operative upon execution to convert input data into output data, and a plurality of cryptographic keys, each of the encrypted component blocks being encrypted with a different one of the cryptographic keys, a decryption engine to decrypt each of the component blocks with a different one of the plurality of cryptographic keys yielding a multiplicity of decrypted component blocks, a code checker to check the executable program including the multiplicity of decrypted component blocks for compliance with one or more requirements of the platform operator, and a signer to sign the executable program with all the component blocks encrypted.

There is also provided in accordance with still another embodiment of the present invention, a method, operating a closed execution environment, the method including receiving an executable program including a multiplicity of encrypted component blocks such that different combinations of blocks selected from the encrypted component blocks are operative when decrypted and executed to perform a same functionally equivalent data transformation, each of the component blocks being operative upon execution to convert input data into output data, receiving a plurality of cryptographic keys, each of the encrypted component blocks being encrypted with a different one of the cryptographic keys, decrypting each of the component blocks with a different one of the plurality of cryptographic keys yielding a multiplicity of decrypted component blocks, checking the executable program including the multiplicity of decrypted component blocks for compliance with one or more requirements of a platform operator, and signing the executable program with all the component blocks encrypted.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded, data stream generally requires more processing and typically more time to read than a data stream which is not encoded. Any recipient of encoded data, whether or not the recipient of the encoded data is the intended recipient is, at least in potential, able to read encoded data without requiting cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" to all their grammatical forms.

The terms "scrambled" and "encrypted", in all of their grammatical forms, am used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DBS, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:
- encoded, but neither scrambled nor encrypted;
- compressed, but neither scrambled nor encrypted;
- scrambled or encrypted, but not encoded;
- scrambled or encrypted, but not compressed;
- encoded, and scrambled or encrypted; or
- compressed, and scrambled or encrypted.

Likewise, the terms "decoded" and "decompressed" one the one hand, and the terms "descrambled" and "decrypted" on the other hand, are used to refer to different and exclusive types of processing.

Figure 1:
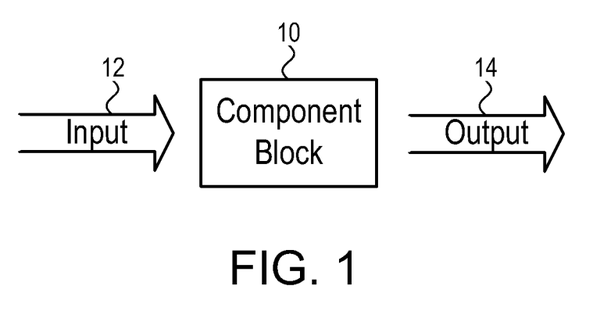
FIG. 1 is a block diagram view of a component block constructed and operative in accordance with an embodiment of the present invention.

Reference is now made to FIG. 1, which is a block diagram view of a component block 10 constructed and operative in accordance with an embodiment of the present invention.

A data transformation is typically constructed from a number of component blocks 10 of code. Each component block 10 of code is herein referred to as a component block 10. A component block 10 performs a function converting input data 12 to output data 14. A representation of a component block 10 is shown in FIG. 1.

Figure 2:
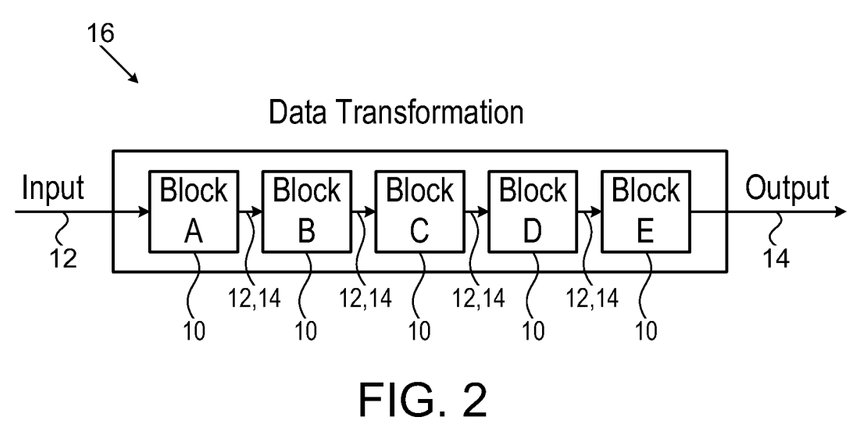
FIG. 2 is a block diagram view of an exemplary data transformation.

Reference is now made to FIG. 2, which is a block diagram view of an exemplary data transformation 16.

One component block 10 implements one step of the data transformation 16. The data transformation 16 is accomplished by sequentially executing component blocks 10, such that the output 14 of the previous component block is input 12 to the next component block 10. A simple example containing five sequentially connected component blocks 10 is shown in FIG. 2.

By way of example only, a component block in a cryptographic data transformation could be a hash function.

By way of example only, a component block could be implemented as a sub-routine.

The construction of the data transfer matron 16 from component blocks 10 may be accomplished using appropriate software program design.

It should be noted that the executable code for one component block 10 is typically independent of other component blocks 10.

In order to create multiple instances of the data transformation 16 that are functionally equivalent, an executable program that implements the data transformation 16 typically includes more component blocks 10 than are needed to execute the data transformation 16 such that a specific instance of the data transformation 16 is realized by connecting a sub-set of the blocks 10 together and such that different sub-sets can be connected to perform the same data transformation 16.

The diversity of the executable code for the data transformation 16 depends on the number of component blocks 10 and the possible sub-sets of the blocks 10 that can be combined to be functionally equivalent. Each of the component blocks 10 for the data transformation 16 included in the executable program typically includes different program code from the other component blocks 10. Therefore, each "instance" of the data transformation 16 is different due to differences in program code.

Figure 3:
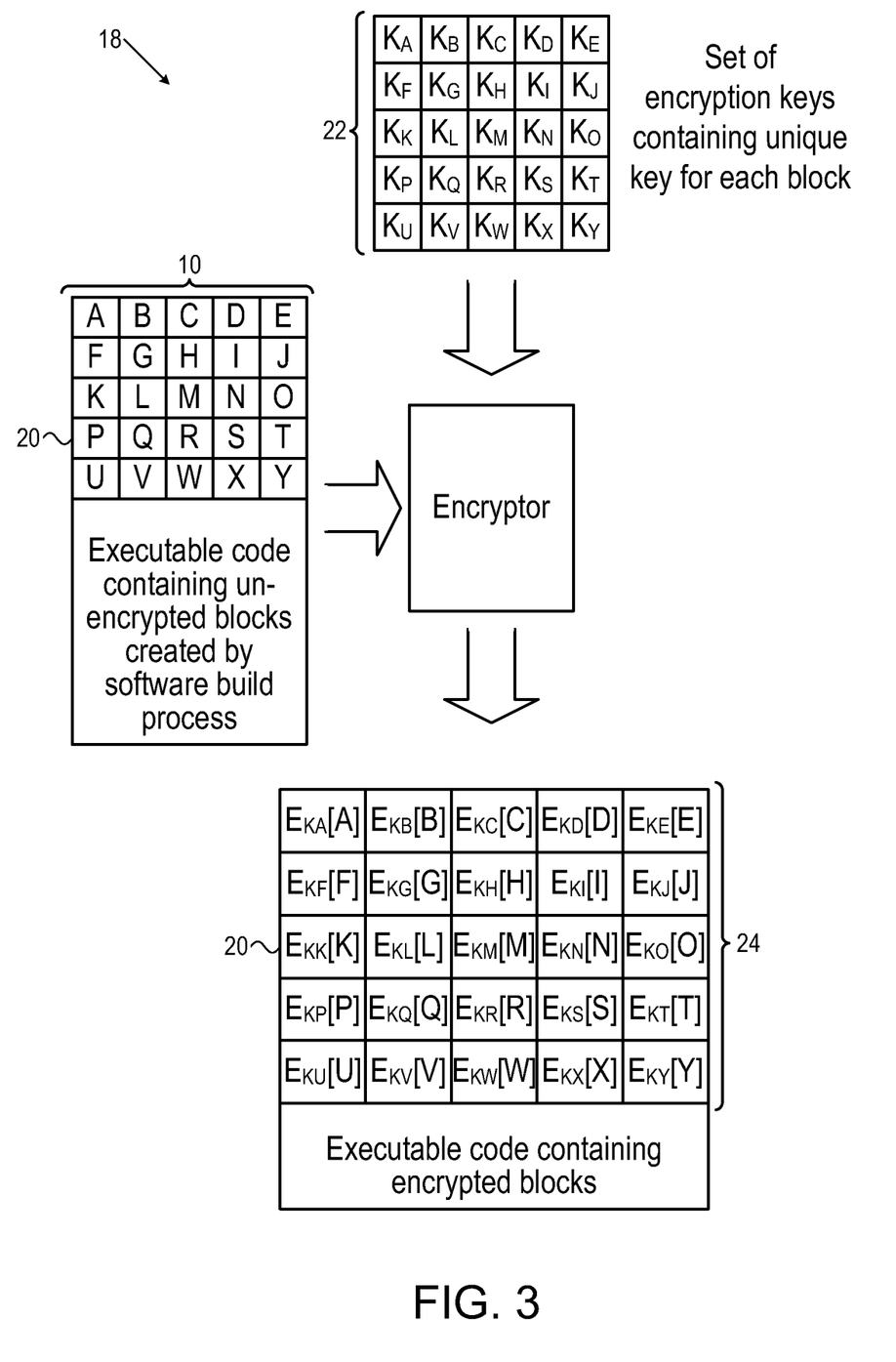
FIG. 3 is a block diagram view showing a software preparation system constructed and operative in accordance with an embodiment of the present invention.

Reference is now made to FIG. 3, which is a block diagram view showing a software preparation system 18 constructed and operative in accordance with an embodiment of the present invention.

A software program 20 with the data transformation 16 (FIG. 2) is typically distributed to the client devices with all the component blocks 10 for the data transformation 16 in encrypted form and a specific set of the blocks are typically decrypted at run-time (or any suitable time prior to run-time) before the data transformation 16 can be executed.

It will be appreciated by those ordinarily skilled in the art that the term, "client device" is used by way of example only, and that any suitable processing device may be used instead for executing the data transformation 16.

The software program 20 typically includes all the component blocks 10 belonging to the data transformation 16. The software executable 20 is created using the compile, link tools and options defined for a particular project. The result of the build process is executable code containing the code for all the component blocks 10 belonging to the data transformation 16.

The executable code for the data transformation 16, created by the build process, is encrypted using a different key 22 for each component block 10. A simple example is shown in FIG. 3 in which component blocks 10 (A to Y) are encrypted using keys 22 ($K_A$ to $K_Y$) to create encrypted code 24 ($E_{KA}[A]$ to $E_{KY}[Y]$).

In order to encrypt the executable code for a component block 10, any suitable method may be used to determine the start location of a component block 10 and the length of code for the component block. For example, information from the map file creating by the build process may be used.

Figure 4:
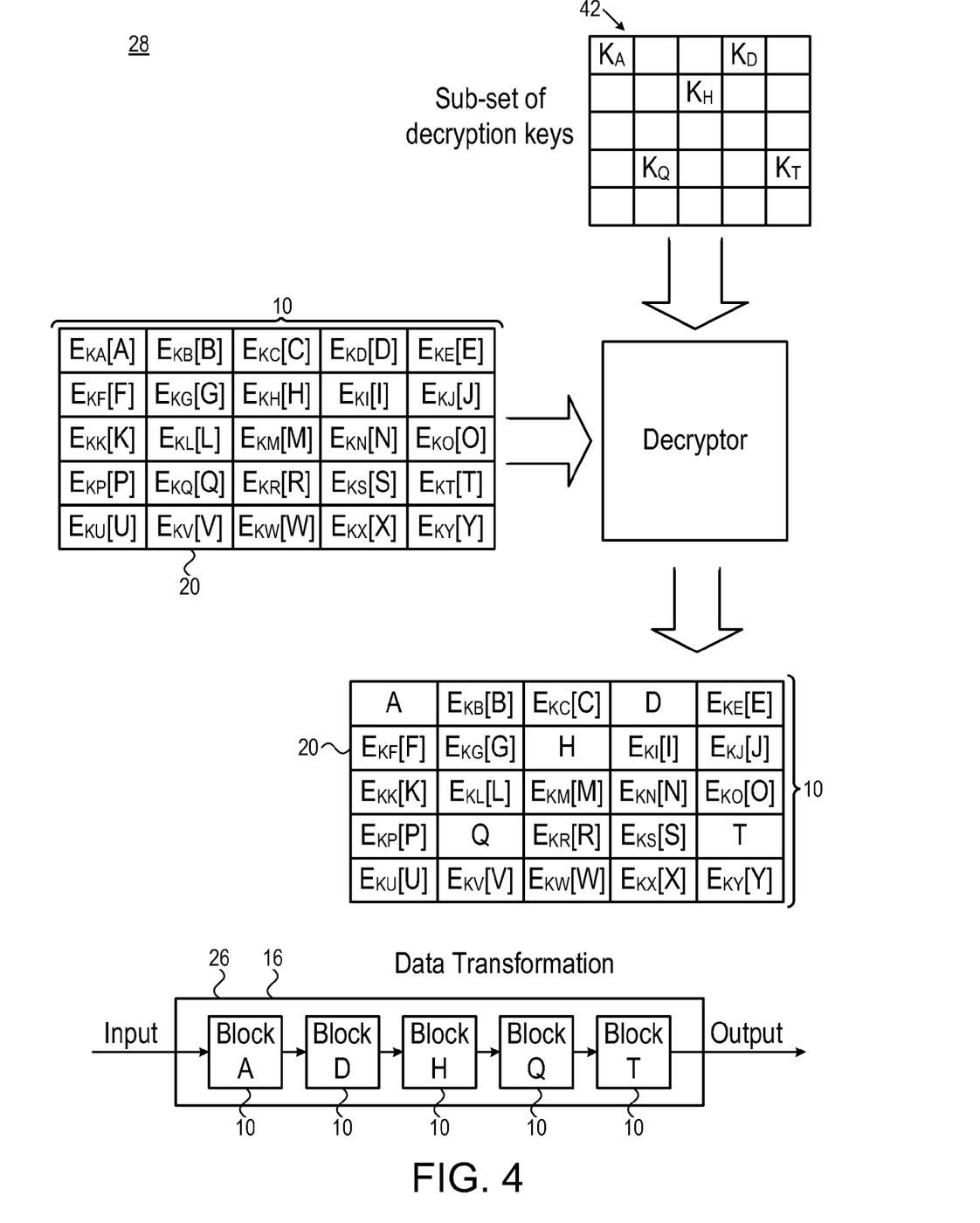
FIG. 4 is a block diagram view showing run-time decryption of executable code in a client device constructed and operative in accordance with an embodiment of the present invention.

Reference is now made to FIG. 4, which is a block diagram view showing run-time decryption of executable code in a client device 28 constructed and operative in accordance with an embodiment of the present invention.

A set of decryption keys 42, and an execution sequence 26, for a specific set of the component blocks 10 that perform the data transformation 16 are provided to the client device 28 before the data transformation 16 is run on that client device 28. By way of example only, the decryption keys 42, and the execution sequence 26, may be delivered to the client device 28 during activation of the software program 20.

Each client typically only receives the decryption keys for the specific set of component blocks 10 that will be used in that particular client. Effectively, the set of decryption keys 42, the sequence information 26, and the input parameters, defines an individualized instance of the data transformation 16 in a specific client device.

FIG. 4 is a simple example of run-time decryption of executable code to create a specific instance of the data transformation 16. In the example of FIG. 4, the client device 28 has received the set of decryption keys 42 for component blocks A, D, H, Q and T, together with, sequence information 26 that defines the order of execution. The component blocks 10 (A, D, H, Q and T) are decrypted prior to execution of the data transformation 16 which is a sequence of blocks A, D, H, Q and T. All other component blocks 10 in the software program 20 remain encrypted.

Figure 5:
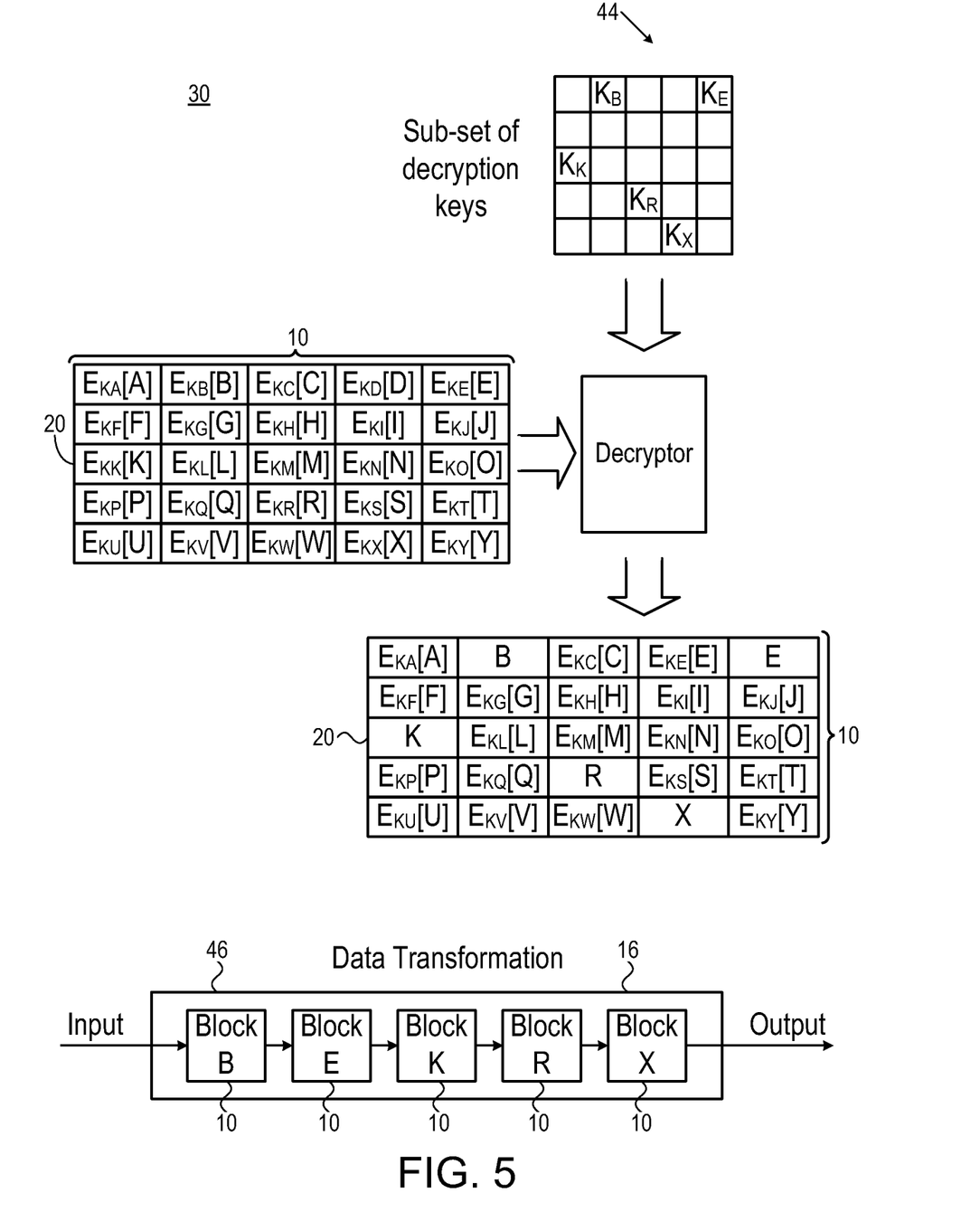
FIG. 5 is a block diagram view showing run-time decryption of executable code in another client device constructed and operative in accordance with an embodiment of the present invention.

Reference is now made to FIG. 5, which is a block diagram view showing run-time decryption of executable code in another client device 30 constructed and operative in accordance with an embodiment of the present invention. In the example of FIG. 5, the client device 30 has received a set of decryption keys 44, together with sequence information 46, for blocks B, E, K, R and X. The data transformation 16 is a sequence of blocks B, E, K, R and X.

In a closed execution environment, the software program 20 is typically submitted to the platform owner with all the component blocks 10 encrypted. For approval, the platform owner receives the decryption keys 22 (FIG. 3) for all the component blocks 10 that belong to the data transformation 16. In this way, the platform owner may inspect the software program 20 with the entire component blocks 10 decrypted and can be satisfied that the encrypted code in the signed application 20 is benign. The platform owner then typically signs the software program 20 with all the component blocks 10 encrypted.

In order to protect against extraction of information from the executable code, the encryption of the component blocks 10 of the data transformation 16 typically protects against static analysis of the data transformation 16, whilst the diversity of the component blocks 10 decrypted in different instances protects against dynamic analysts of the data transformation 16.

Optionally, additional component blocks 10 may be included in the executable program 20 to provide redundancy such that these additional blocks 10 are not needed to create all the instances of the executable program 20 in deployment for all the client devices. Essentially, these additional component blocks 10 are held in reserve, possibly to replace or complement other blocks 10 in the future, such that none of these component blocks 10 are used in any of the deployed instances of the executable program 20 at present, although they may be used in the future. These reserve component blocks 10 embedded in the software program 20 may be used to securely extend the scope of the data transformation 16 in a specific client, for example, but not limited to, the case when a specific instance of the program 20 has been exploited.

Figure 6:
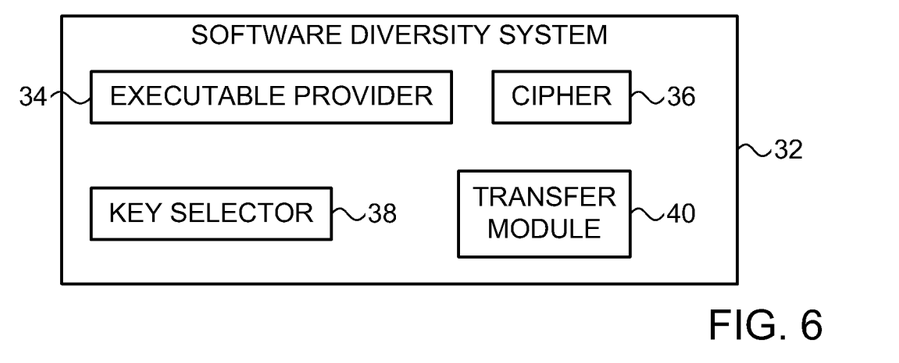
FIG. 6 is a block diagram view of a software diversity system constructed and operative in accordance with an embodiment of the present invention.

Reference is now made to FIG. 6, which is a block diagram view of a software diversity system 32 constructed and operative in accordance with an embodiment of the present invention.

The software diversity system 32 includes: an executable provider 34, a cipher 36, a key selector 38 and a transfer module 40. The executable provider 34, the cipher 36, the key selector 38 and the transfer module 40 may be implemented in software and/or hardware, for example, but not limited to, a suitably programmed computer.

The executable provider 34 is typically operative to provide an executable software program including the plurality of component blocks 10 (FIG. 3) such that different combinations of blocks 10 selected from the plurality of component blocks 10 are operative when executed to perform a same functionally equivalent data transformation 16 (FIG. 2). The different blocks 10 are typically designed using software design and development as described above. Each of the component blocks 10 is operative upon execution to convert input data 12 (FIG. 2) into output data 14 (FIG. 2). Each of the different combinations of blocks 10 includes a sequence in which the component blocks 10 are executed to perform the same functionally equivalent data transformation 16. Each of the component blocks 10 includes executable code.

The cipher 36 is typically operative to encrypt the executable program 20 (FIG. 3) by encrypting the plurality of component blocks 10 (FIG. 3) with a plurality of cryptographic keys 22 (FIG. 3) such that each of the plurality of component blocks 10 is encrypted with a different one of the plurality of cryptographic keys 22 yielding a multiplicity of encrypted component blocks 10 within the executable program 20.

The key selector 38 is operative to select a first selection of cryptographic keys 42 (FIG. 4) from the plurality of the cryptographic keys 22 (FIG. 3) for the client device 28 (FIG. 4), such that the first selection of cryptographic keys 42 is operative to decrypt a first combination of the component blocks 10 (FIG. 4). The first combination of the component blocks 10 is operative when executed to perform the same functionally equivalent data transformation 16 (FIG. 4) thereby allowing the first client device 28 to perform the same data transformation 16 by using the first combination of the component blocks 10.

Cryptographic key selections are similarly performed for each instance of the data transformation 16 (FIG. 5). The following paragraph describes the selection for the client device 30 (FIG. 5) which will execute a second instance of the data transformation 16.

The key selector 38 is also typically operative to select a second selection of cryptographic keys 44 (FIG. 5) selected from the plurality of the cryptographic keys 22 (FIG. 3) for the client device 30 (FIG. 5), such that the second selection of cryptographic keys 44 is operative to decrypt a second combination of the component blocks 10. The second combination of the component blocks 10 is operative when executed to perform the same functionally equivalent data transformation 16 (FIG. 5) thereby allowing the second client device 30 to perform the same data transformation 16 by using the second combination of the component blocks 10.

The first selection and the second selection of cryptographic keys 42, 44 (FIGS. 4 and 5) include at least one different cryptographic key such that the first selection 42 and second selection 44 are not identical.

The transfer module 40 is typically operative to prepare for transfer: the first selection of cryptographic keys 42 (FIG. 4) for transfer to the first client device 28 (FIG. 4) without including cryptographic keys of the plurality of cryptographic keys 22 (FIG. 3) which are not in the first selection 42; the second selection of cryptographic keys 44 (FIG. 5) for transfer to the second, client, device 30 (FIG. 5) without including cryptographic keys of the plurality of cryptographic keys 22 which are not in the second selection 44; collections of cryptographic keys to other devices depending on the instance of the data transformation 16 which will be run on each of the client devices; and sequence information 26, 46 (FIGS. 4 and 5) to each one of the client devices 28, 30 detailing the sequence appropriate to the combination of blocks 10 executable by that client device 28, 30. The keys 42, 44 and the sequence information 26, 46 are typically prepared in a secure fashion and transferred from the system 32 to the client devices 48 in a secure fashion, for example, but not limited to, via a DRM server. The keys 42, 44 may be protected in the client devices 48 during storage and/or usage, for example, using secrets received during device activation.

It should be noted that the selected keys 42, 44 (FIGS. 4 and 5) may be transferred from the software diversity system 32 using any suitable communication system, for example, but not limited to, Satellite, Cable, Internet and Terrestrial communication systems. The selected keys 42, 44 may be transferred from the software diversity medium 32 by any suitable medium, for example, but not limited to, a dongle, a flash disk or CD.

The executable program 20 (FIG. 3) including all the encrypted component blocks 10 may be distributed to the client devices 28, 30 (FIGS. 4 and 5) using any suitable method. By way of example only, the executable program 20 may be downloaded from an application store, such as iPhone™ App Store or loaded on to the client devices 28, 30 during production of the client devices 28, 30.

When the software diversity system 32 sends the cryptographic keys 22 (FIG. 3) to the platform operator, the transfer module 40 of the software diversity system 32 is operative to send all the cryptographic keys 22 for each of the encrypted component blocks 10 to the platform operator. This is particularly useful when the platform operator is operating a closed execution environment as will be described in more detail below with reference to FIG. 8.

Figure 7:
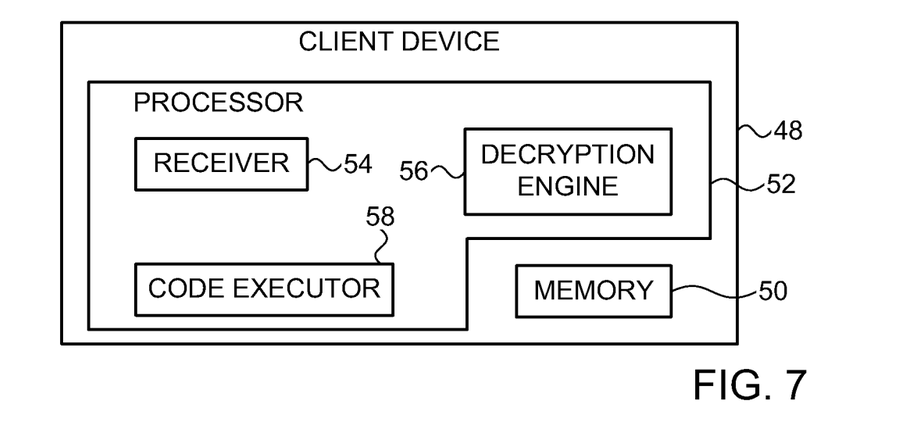
FIG. 7 is a block diagram view of a client device constructed and operative in accordance with an embodiment of the present invention.

Reference is now made to FIG. 7, which is a block diagram view of a client device 48 constructed and operative in accordance with an embodiment of the present invention.

The client device 48 includes a memory 50 and a processor 52. The processor 52 typically includes a receiver 54, a decryption engine 56 and a code executor 58.

The memory 50 is typically operative to store the executable program 20 (FIG. 3) including a multiplicity of encrypted component blocks 10 (FIG. 3). The executable program 20 may be received via a communication system or on a medium such as a flash disk or compact disk. The executable program 20 may be loaded, on to die client device 48 during production of the client device 48.

The receiver 54 is typically operative to receive a selection of cryptographic keys selected from the cryptographic keys 22 (FIG. 3).

Different combinations of blocks 10 (FIG. 3) selected from the encrypted component blocks 10 are operative when decrypted and executed to perform a same functionally equivalent data trans formation 16 (FIG. 2). However, each device is only given enough keys to decrypt some of die encrypted component blocks 10 as will be described in more detail below. Typically, each device is given enough cryptographic keys to enable decryption of the encrypted component blocks 10 for one combination of the blocks 10 in order to perform the data transformation 16.

Each component block 10 is operative upon execution to convert input data 12 (FIG. 2) into output data 14 (FIG. 2).

Each different combination of blocks 10 typically includes a sequence in which the component blocks 10 are executed to perform the same functionally equivalent data transformation 16 (FIG. 2).

The decryption engine 56 is typically operative to decrypt some of the encrypted component blocks 10 (FIG. 3) using the cryptographic keys such that each one of the some encrypted component blocks 10 is decrypted with a different one of the cryptographic keys yielding a multiplicity of decrypted component blocks 10. The functionality of the decryption engine 56 may be at least partially included in the functionality of the executable program 20 (FIG. 3) so that the executable program 20 may be described as "self-decrypting".

The receiver 54 is also operative to receive sequence information detailing the sequence appropriate to the component blocks 10 (FIG. 3) decrypted by the decryption engine 56. The functionality of the receiver 54 to receive the cryptographic keys and/or the sequence information may be at least partially included in the functionality of the executable program 20 so that the executable program 20 requests and receives the keys and/or sequence information.

The code executor 58 is typically operative to execute the executable program 20 (FIG. 3) including the multiplicity of decrypted component blocks 10 (FIG. 3) to perform the same functionally equivalent data transformation 16 (FIG. 2). In accordance with an embodiment of the present invention, the code executor 58 is operative to execute the data transformation 16 in a closed execution environment. It will be appreciated by those ordinarily skilled in the art that the code executor 58 may execute the data transformation 16 in any suitable execution environment.

The client device 48 may include a code checker (not shown) for checking a digital signature of the executable program 20 (FIG. 3) which includes the encrypted component blocks 10 (FIG. 3). The creation of the digital signature by the platform operator is described in more detail below with reference to FIG. 8.

It should be noted that the decryption engine 56 and the code executor 58 may be embodied as a single element. It will be appreciated that any of the elements, described herein may be combined with other elements or alternatively broken down into sub-elements.

Figure 8:
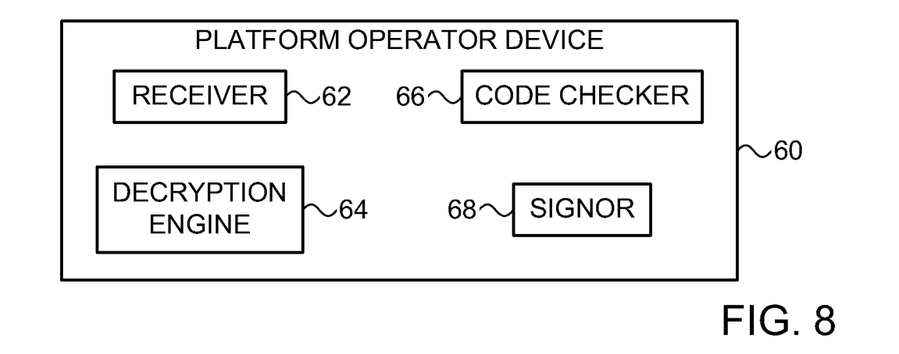
FIG. 8 is a block diagram view of a platform operator constructed and operative in accordance with an embodiment of the present invention.

Reference is now made to FIG. 8, which is a block diagram view of a platform operator 60 constructed and operative in accordance with an embodiment of the present invention.

The platform operator 60 typically includes physical computing machinery including: a receiver 62, a decryption engine 64, a code checker 66 and a signer 68.

The receiver 62 is typically operative to receive: the software program 20 (FIG. 3) and the plurality of cryptographic keys 22 (FIG. 3).

The software program 20 (FIG. 3) received for checking generally includes a multiplicity of encrypted component blocks 10 (FIG. 3) such that different combinations of blocks 10 selected from the encrypted component blocks 10 are operative when decrypted and executed to perform a same functionally equivalent data transformation 16 (FIG. 2). Each component block 10 is operative upon execution to convert input data 12 (FIG. 2) into output data 14 (FIG. 2).

The decryption engine 64 is generally operative to decrypt each of the encrypted, component blocks 10 (FIG. 3) using the cryptographic keys 22 (FIG. 3) such that each one of the encrypted component blocks 10 is decrypted with a different one of the cryptographic keys 22 yielding a multiplicity of decrypted component blocks 10.

The code checker 66 is typically operative to check the decrypted component blocks 10 (FIG. 3) for compliance with the requirements of the platform operator 60.

The signer 68 is typically operative to sign die software program 20 (FIG. 3), which includes the multiplicity of encrypted component blocks 10 (FIG. 3), with a digital signature (not shown).

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded in electronic form, over a network, for example. Alternatively or additionally, the software may be stored in tangible, non-transitory computer-readable storage media, such as optical, magnetic, or electronic memory. It is appreciated that at least some of the software components of the present invention may, if desired, be implemented in ROM (read only memory) form.

It will be appreciated that various features, of the invention which are, for clarity, described in the contests of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A processing device, comprising:
a memory to store an executable program including a multiplicity of encrypted component blocks such that different combinations of blocks selected from the encrypted component blocks are operative when decrypted and executed to perform a same functionally equivalent data transformation, each of the component blocks being operative upon execution to convert input data into output data; and
a processor operative to:
receive a selection of cryptographic keys;
decrypt some of the encrypted component blocks using the cryptographic keys such that each one of the some encrypted component blocks is decrypted with a different one of the cryptographic keys yielding a multiplicity of decrypted component blocks; and
execute the executable program including the multiplicity of decrypted component blocks to perform the same functionally equivalent data transformation, wherein each of the different combinations of blocks includes a sequence in which the component blocks are executed to perform the same functionally equivalent data transformation, the processor being operative to receive sequence information detailing the sequence appropriate to the component blocks decrypted by the processor and wherein the processor is operative to execute the data transformation in a closed execution environment in which the executable program is authenticated prior to execution.

2. The device according to claim 1, wherein the executable program includes a digital signature, the device further comprising a code checker to check the digital signature of the executable program.

3. A method comprising:
storing an executable program including a multiplicity of encrypted component blocks such that different combinations of blocks selected from the encrypted component blocks are operative when decrypted and executed to perform a same functionally equivalent data transformation, each of the component blocks being operative upon execution to convert input data into output data;
receiving a selection of cryptographic keys; decrypting some of the encrypted component blocks using the cryptographic keys such that each one of the some encrypted component blocks is decrypted with a different one of the cryptographic keys yielding a multiplicity of decrypted component blocks; and
executing the executable program including the multiplicity of decrypted component blocks to perform the same functionally equivalent data transformation, wherein each of the different combinations of blocks includes a sequence in which the component blocks are executed to perform the same functionally equivalent data transformation, the method further comprising receiving sequence information detailing the sequence appropriate to the some decrypted component blocks and wherein the execution of the data transformation is executed in a closed execution environment in which the executable program is authenticated prior to execution.

4. The method according to claim 3, wherein the executable program includes a digital signature, the method further comprising checking the digital signature of the executable program.

* * * * *

UNITED STATES PATENT AND TRADEMARK OFFICE
CERTIFICATE OF CORRECTION

PATENT NO. : 9,223,945 B2  
APPLICATION NO. : 14/716948  
DATED : December 29, 2015  
INVENTOR(S) : Leonid Sandler et al.

Page 1 of 3

It is certified that error appears in the above-identified patent and that said Letters Patent is hereby corrected as shown below:

In the Specification:

Column 1, line 12 approx., "Sandier," to read as --Sandler,--.

Column 3, line 22 approx., "against," to read as --against--.

Column 1, line 39 approx., "Elbaum" to read as --Elbaum,--.

Column 1, line 55, "bat" to read as --but--.

Column 1, line 58, "tinder" to read as --under--.

Column 2, line 1, "mast" to read as --must--.

Column 2, line 2, "execution," to read as --execution--.

Column 2, line 9 approx., "inversion," to read as --invention,--.

Column 2, line 14 approx., "execution," to read as --execution--.

Column 2, line 31 approx., "as" to read as --an--.

Column 2, line 32 approx., "terms" to read as --term--.

Column 3, line 32, "die" to read as --the--.

Column 3, line 50, "bat" to read as --but--.

Column 4, line 7, "perform," to read as --perform--.

Signed and Sealed this  
Twenty-third Day of August, 2016

Michelle K. Lee  
*Director of the United States Patent and Trademark Office*

CERTIFICATE OF CORRECTION (continued)
U.S. Pat. No. 9,223,945 B2

Column 4, line 29, "sub" to read as --still--.

Column 4, line 49, "transformation/thereby" to read as --transformation thereby--.

Column 5, line 2, "axe" to read as --are--.

Column 5, line 41 approx., "signer" to read as --signor--.

Column 6, line 37, "encoded," to read as --encoded--.

Column 6, line 42, "requiting" to read as --requiring--.

Column 6, line 62, "to" to read as --in--.

Column 6, line 64, "am" to read as --are--.

Column 7, line 4, "DBS," to read as --DES,--.

Column 7, line 47, "transfer matron" to read as --transformation--.

Column 8, line 15, "term," to read as --term--.

Column 8, line 57, "with," to read as --with--.

Column 9, line 21 approx., "analysts" to read as --analysis--.

Column 10, line 38, "second, client," to read as --second client--.

Column 11, line 21, "loaded," to read as --loaded--.

Column 11, line 21, "die" to read as --the--.

Column 11, line 29 approx., "trans formation" to read as --transformation--.

Column 11, line 30 approx., "die" to read as --the--.

Column 12, line 12, "elements," to read as --elements--.

Column 12, line 20, "signer" to read as --signor--.

Column 12, line 33, "encrypted," to read as --encrypted--.

Column 12, line 41, "signer" to read as --signor--.

Column 12, line 41, "die" to read as --the--.

CERTIFICATE OF CORRECTION (continued)
U.S. Pat. No. 9,223,945 B2

Column 12, line 59, "features," to read as --features--.

Column 12, line 60, "contests" to read as --contexts--.